(12) United States Patent
Peeters

(10) Patent No.: US 9,315,393 B2
(45) Date of Patent: Apr. 19, 2016

(54) HYDROGEN CHLORIDE REMOVAL PROCESS

(71) Applicant: Tessenderlo Chemie NV, Brussels (BE)

(72) Inventor: Rudy Peeters, Tessenderlo (BE)

(73) Assignee: Tessenderlo Chemie NV, Brussels (BE)

( * ) Notice: Subject to any disclaimer, the term of this patent is extended or adjusted under 35 U.S.C. 154(b) by 19 days.

(21) Appl. No.: 14/285,142

(22) Filed: May 22, 2014

(65) Prior Publication Data

US 2014/0348730 A1    Nov. 27, 2014

(30) Foreign Application Priority Data

May 22, 2013   (EP) .................................... 13168775
Dec. 5, 2013   (EP) .................................... 13195781

(51) Int. Cl.

| | | |
|---|---|---|
| *B01D 53/68* | (2006.01) | |
| *C23G 1/36* | (2006.01) | |
| *C23F 1/46* | (2006.01) | |
| *C01G 49/06* | (2006.01) | |
| *B01F 5/02* | (2006.01) | |
| *B01F 5/10* | (2006.01) | |
| *B01D 53/78* | (2006.01) | |
| *B01F 3/04* | (2006.01) | |
| *C01G 49/10* | (2006.01) | |
| *C02F 1/52* | (2006.01) | |

(52) U.S. Cl.
CPC ................ *C01G 49/06* (2013.01); *B01D 53/68* (2013.01); *B01D 53/78* (2013.01); *B01F 3/0451* (2013.01); *B01F 5/0256* (2013.01); *B01F 5/106* (2013.01); *C01G 49/10* (2013.01); *C23G 1/36* (2013.01); *C02F 1/5245* (2013.01); *C23F 1/46* (2013.01)

(58) Field of Classification Search
CPC .............. B01D 53/68; C23G 1/36; C23F 1/46
See application file for complete search history.

(56) References Cited

U.S. PATENT DOCUMENTS

| 4,563,338 A | 1/1986 | Séon et al. | |
|---|---|---|---|
| 5,328,670 A * | 7/1994 | Hirabayashi et al. | ......... 423/140 |

FOREIGN PATENT DOCUMENTS

| BE | 1011575 A3 | 11/1999 | |
|---|---|---|---|
| DE | 3441793 A1 * | 5/1986 | ................ C23F 1/46 |
| EP | 0968961 A2 | 1/2000 | |
| GB | 1183006 A * | 3/1970 | ................ C23F 1/46 |
| JP | S6360833 B2 * | 11/1988 | ................ C23F 1/46 |
| JP | 2002-001365 | 1/2002 | |
| WO | WO 9322049 A1 * | 11/1993 | ............ B01D 53/68 |
| WO | WO 2010/138443 A1 | 12/2010 | |

* cited by examiner

*Primary Examiner* — Timothy Vanoy

(57) ABSTRACT

A hydrogen chloride removal process includes (i) contacting in a reactor an aqueous solution, which includes one or more $Fe^{2+}$-compounds, with a fluid, which includes an oxidizing agent, hydrochloric acid gas and optionally chlorine gas; and (ii) oxidizing the $Fe^{2+}$-compounds to $Fe^{3+}$-compounds, thereby converting the fluid to an exhaust gas, which has a reduced hydrochloric acid content.

21 Claims, 1 Drawing Sheet

HYDROGEN CHLORIDE REMOVAL PROCESS

TECHNICAL FIELD

The present invention relates to a hydrogen chloride removal process. More specifically, the present invention relates to the field of removal of hydrochloric acid from a fluid by absorption in a solution comprising $Fe^{2+}$-compounds such as e.g. ferrous chloride with subsequent oxidation of said ferrous chloride to ferric chloride.

INTRODUCTION

Hydrochloric acid-containing waste gases with low hydrochloric acid content and inert components such as air, nitrogen gas, carbon dioxide or combustion gases are generally treated in order to substantially reduce the concentration of hydrochloric acid before disposal of the waste gas in the atmosphere. Such treatments are essentially comprised of absorbing hydrochloric acid in water, thereby generating a hydrochloric acid solution with a concentration significantly lower than 30% wt., known in the technical field as 'fatal acid,' which is of little interest for further use in technical applications.

Several publications, however, report on useful applications of gaseous hydrochloric acid for industrial uses.

WO 2010/138443 describes a process for forming ferric chloride solutions that are stable at relatively low temperatures and suitable for transportation without precipitation, by absorbing gaseous hydrochloric acid in ferric chloride solutions. The stable ferric chloride solutions have an iron content of 16 to 23% wt. and a hydrochloric acid content of 10 to 17% wt., wherein the ferric chloride solution is a stable solution and/or reversibly freezes at −10° C.

US 2003/0211031 describes a method to produce ferric chloride by conversion of pickle liquor containing ferrous chloride and fortified with sufficient HCl to ferric chloride in the presence of oxygen in a tower at a temperature above 132° F. The ferric chloride solution from the tower is subjected to evaporation so as to increase the concentration of the ferric chloride. The resultant concentrate is recycled into the tower until a concentration of about 40% by weight ferric chloride is obtained. A gas phase from either or both of the tower and the evaporator is scrubbed in order to remove HCl which can be used to fortify the pickle liquor.

EP 0938961 describes a process for treating waste HCl pickle liquor by oxidation to form aqueous ferric chloride ($FeCl_3$) without using chlorine gas. In accordance with the process, heavy metals and other impurities are removed from the waste HCl pickle liquor, as desired. The ferrous chloride-containing solution is oxidized in the presence of a stoichiometric amount of HCl to form aqueous ferric chloride solution. The resulting solution, which is relatively dilute, preferably is concentrated, typically by evaporation. Ferric chloride solution is useful, for example, for water treatment.

Most methodologies, however, envisage to employ a relatively highly concentrated hydrochloric acid gas in the process in order to ensure good conversion or absorption. Regrettably, methods for chlorine removal or recovery from a gaseous hydrochloric acid composition with a content of hydrochloric acid lower than 15 vol. % on an industrially viable scale are not documented.

In addition, most industrial application require a stoichiometric excessive use of hydrochloric acid, an economically undesirable condition with generation of additional waste hydrochloric acid, the latter requiring chemical neutralisation before disposal.

Also, presently available methods do not ensure a sufficiently low concentration of hydrochloric acid in the exhaust gases for allowing disposal in the atmosphere. Neither do these methods prevent the generation of waste generated during the hydrogen chloride removal process.

In case of absorption in or generation of ferric salt solutions, the need for additional processing steps for enhancing the concentration of ferric salt is an energy-intensive and environmentally objectionable alternative.

SUMMARY OF THE INVENTION

The current invention provides in a solution for at least one of the above mentioned problems by providing a hydrogen chloride removal process, as described in claim 1.

In a first aspect, the present invention provides a hydrogen chloride removal process, comprising the steps of:
i. contacting in a reactor an aqueous solution comprising one or more $Fe^{2+}$-compounds with a fluid comprising an oxidizing agent, hydrochloric acid gas and optionally chlorine gas; and
ii. oxidizing said $Fe^{2+}$-compounds to $Fe^{3+}$-compounds, thereby converting said fluid comprising hydrochloric acid gas to an exhaust gas comprising a reduced hydrochloric acid content.

This is of interest because this process allows for (i) the recovery of chlorine from a fluid comprising an oxidizing agent; and for (ii) a substantial reduction of hydrochloric acid in exhaust gases, thereby allowing for the disposal of said exhaust gas in the atmosphere without any need for additional treatment.

In addition, said process prevents the generation of industrial waste in the form of, e.g. fatal acid, and the necessity for subsequent neutralization, disposal and/or storage.

Furthermore, said process is of interest since chlorine gas ($Cl_2$) present in said fluid comprising hydrochloric acid gas is simultaneously removed under the same conditions and process parameters. Therefore, no special equipment or additional process steps are required to remove chlorine gas.

In a second aspect, the present invention provides an aqueous ferric chloride solution obtainable by a process according to the first aspect of the invention.

This is of interest because thereby a product is obtained comprising chlorine from an industrial waste source, the product itself being of use in further industrial applications. Thereby, neutralization, disposal and/or storage of waste components is evaded.

In a third aspect, the present invention provides in a use of a ferric salt solution according to the second aspect of the invention in a water or wastewater treatment process.

This is of interest because in addition to preventing waste generation, said hydrogen chloride removal process results in products that can be used for applications in the field of environmental protection.

DESCRIPTION OF THE FIGURES

By means of further guidance, figures are included to better appreciate the teaching of the present invention. Said figures are intended to assist the description of the invention and are nowhere intended as a limitation of the presently disclosed invention.

The figures and symbols contained therein have the meaning as commonly understood by one of ordinary skill in the art to which this invention belongs.

DETAILED DESCRIPTION OF THE INVENTION

Figure 1:
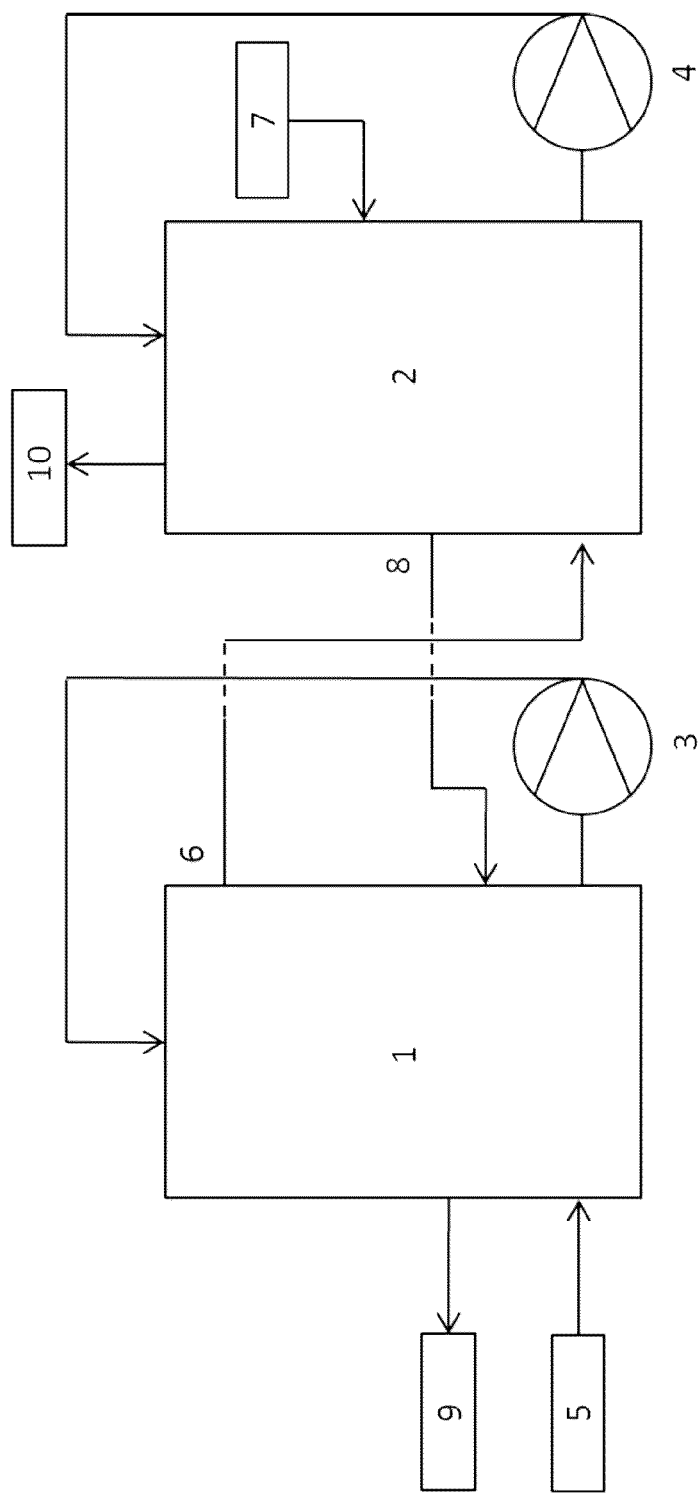
FIG. 1 shows a process scheme of a hydrogen chloride removal unit according to the present invention.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints. All percentages are to be understood as percentage by weight, abbreviated as "% wt." or as volume per cent, abbreviated as "vol. %", unless otherwise defined or unless a different meaning is obvious to the person skilled in the art from its use and in the context wherein it is used.

In a first aspect, the present invention provides a hydrogen chloride removal process, comprising the steps of:
  i. contacting in a reactor an aqueous solution comprising one or more $Fe^{2+}$-compounds with a fluid comprising an oxidizing agent, hydrochloric acid gas and optionally chlorine gas; and
  ii. oxidizing said $Fe^{2+}$-compounds to $Fe^{3+}$-compounds,
thereby converting said fluid comprising hydrochloric acid gas to an exhaust gas comprising a reduced hydrochloric acid content.

Hereby, the term "fluid comprising an oxidizing agent, hydrochloric acid gas and optionally chlorine gas" refers to a liquid and/or a gas, comprising an oxidizing agent and further comprising hydrochloric acid in an amount of 0.01 to 99 vol. % of hydrochloric acid. More preferably, said gas comprises between 0.05 and 75 vol. % of hydrochloric acid.

In a more preferred embodiment, said fluid comprising an oxidizing agent, hydrochloric acid gas and optionally chlorine gas comprises hydrochloric acid in an amount of 0.1 to 50.0 vol. % hydrochloric acid, even more preferably of 0.1 to 25.0 vol. % hydrochloric acid, more preferable than that of about 0.1 to 20.0 vol. % hydrochloric acid. Most preferably, said concentration is between 0.1 and 15.0 vol. % of hydrochloric acid.

In another preferred embodiment, said fluid comprising an oxidizing agent, hydrochloric acid gas and optionally chlorine gas comprises hydrochloric acid in an amount of at most 99 vol. %, preferably at most 95 vol. %, more preferably at most 90 vol. %, even more preferably at most 85 vol. %, yet more preferably at most 80 vol. %, still more preferably at most 75 vol. %, even more preferably at most 70 vol. %, even still more preferably at most 65 vol. %, yet still more preferably at most 60 vol. %, yet even more preferably at most 55 vol. % of hydrochloric acid.

The term "an oxidizing agent" refers to any known oxidizing agent capable of oxidizing $Fe^{2+}$-compounds to $Fe^{3+}$-compounds, such as but not limited to e.g. $O_2$, $H_2O_2$ and $NaClO_3$. This is advantageous because said oxidizing agent allows for the oxidation of $Fe^{2+}$-compounds to $Fe^{3+}$-compounds. Moreover, said oxidizing agent enhances the rate of conversion of $Fe^{2+}$-compounds to $Fe^{3+}$-compounds.

Even more specifically, the term "fluid comprising an oxidizing agent, hydrochloric acid gas and optionally chlorine gas" refers to a fluid as described above, further comprising chlorine gas ($Cl_2$).

The term "aqueous solution comprising one or more $Fe^{2+}$-compounds" refers to a solution comprised of water and at least one $Fe^{2+}$-compound, such as $FeCl_2$ and $FeO$.

The term "oxidizing said $Fe^{2+}$-compounds to $Fe^{3+}$-compounds" refers to a chemical reaction whereby one or more $Fe^{2+}$-compounds are converted to $Fe^{3+}$-compounds according to equation (2), optionally preceded by a reaction according to equation (1).

$$FeO + 2HCl \rightarrow FeCl_2 + H_2O \tag{1}$$

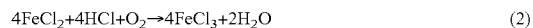

$$4FeCl_2 + 4HCl + O_2 \rightarrow 4FeCl_3 + 2H_2O \tag{2}$$

In general, equation (2) is referred to as an oxychlorination reaction. In addition, chlorine gas present in said fluid comprising hydrochloric acid gas is consumed in a reaction according to equation (3).

$$FeCl_2 + \tfrac{1}{2}Cl_2 \rightarrow FeCl_3 \tag{3}$$

Another reaction that can take place is the conversion of ferric oxide, $Fe_2O_3$, to ferric chloride, $FeCl_3$ according to equation (4).

$$Fe_2O_3 + 6HCl \rightarrow 2FeCl_3 + 3H_2O \tag{4}$$

Next to iron (II) oxide and iron (II) chloride, other iron (II) compounds are suitable for scavenging hydrochloric acid with the concomitant conversion by oxidation of said $Fe^{2+}$-compounds to $Fe^{3+}$-compounds. As one additional example, however not limiting, equations (5) and (6) illustrate that $FeSO_4$ is equally suitable in the scope of the invention.

$$4FeSO_4 + 4HCl + O_2 \rightarrow 4FeClSO_4 + 2H_2O \tag{5}$$

$$FeSO_4 + \tfrac{1}{2}Cl_2 \rightarrow FeClSO_4 \tag{6}$$

This concept is more readily understood by the process described in FIG. 1. A gas comprising hydrochloric acid (5) derived from e.g. hydrochloric acid storage tanks comprises a concentration of hydrochloric acid sufficient to oxidize said $Fe^{2+}$-compounds, e.g. 1% wt. Said gas comprising hydrochloric acid (5) is brought in a first oxychlorination reactor (1) where it is mixed with a low concentrated ferrous chloride solution (7) which is an aqueous solution derived from the second oxychlorination reactor (2). Thereby, the concentration of hydrochloric acid in the aqueous liquid in said first oxychlorination reactor (1) is increased and said ferrous chloride is oxidized in presence of oxygen present in the reactor to ferric chloride according to equation (2).

An aqueous solution comprising ferric chloride (9) is evacuated from said first oxychlorination reactor (1) as a product obtained by said hydrogen chloride removal process.

The exhaust gas (6) leaving said first oxychlorination reactor (1) comprises a residual amount of hydrochloric acid gas and is led to a second oxychlorination reactor (2) for further hydrogen chloride removal. In said second oxychlorination reactor (2), said exhaust gas comprising gaseous hydrochloric acid (6) is absorbed in an aqueous solution comprising one or more $Fe^{2+}$-compounds (7) such as ferrous chloride and/or ferrous oxide from waste pickle liquor, thereby yielding an exhaust gas (10) substantially purified from hydrochloric acid.

In order to enhance the absorption and oxidation efficiencies of said oxychlorination reactors, the content of the reactors is partially recycled via pumps (3 and 4) according to good practice.

Process control can be performed by analysis of hydrochloric gas in said exhaust gas (6 and/or 10) and adapting of liquid and/or gaseous reagent and/or product flows. Optionally, process control can analogously be ensured by electrochemical measurement of the concentrations of $Fe^{2+}$- and/or $Fe^{3+}$-compounds in said oxychlorination reactors (1 and/or 2) and/or in liquid effluent streams (3, 4, 8 and/or 9).

In a more preferred embodiment, said exhaust gas (10) comprises hydrochloric acid in an amount lower than 300 mg/Nm$^3$, preferably lower than 100 mg/Nm$^3$, more preferably lower than 50 mg/Nm$^3$, more preferably than that, lower than 30 mg/Nm$^3$, even more preferably lower than 20 mg/Nm$^3$, most preferably lower than 10 mg/Nm$^3$.

In an even more preferred embodiment, said exhaust gas (10) comprises hydrochloric acid in an amount lower than 5 mg/Nm$^3$, and most preferably lower than 1 mg/Nm$^3$.

This is of interest because this process allows for (i) the recovery of chlorine from a fluid comprising hydrochloric acid gas; and for (ii) a substantial reduction of hydrochloric acid in exhaust gases, thereby allowing for the disposal of said exhaust gas in the atmosphere without any further treatment.

In a preferred embodiment, the present invention provides a process according to the first aspect, whereby said fluid comprises a reactor feed gas comprising an oxidizing agent, hydrochloric acid gas and optionally chlorine gas; and whereby said hydrochloric acid gas is comprised in an amount of at most 99 vol. %, preferably at most 95 vol. %, more preferably at most 90 vol. %, even more preferably at most 85 vol. %, yet more preferably at most 80 vol. %, still more preferably at most 75 vol. %, even more preferably at most 70 vol. %, even still more preferably at most 65 vol. %, yet still more preferably at most 60 vol. %, preferably 0.1 to 60.0 vol. %, more preferably 0.1 to 50.0 vol. %, still more preferably 0.5 to 45.0 vol. %; thereby converting said reactor feed gas comprising hydrochloric acid to a reactor exhaust gas comprising a reduced hydrochloric acid content compared to said reactor feed gas. This is advantageous because the described process allows for sequestration of a diluted amount of hydrochloric acid from a gas or gas flow, while simultaneously oxidising $Fe^{2+}$-compounds in an aqueous solution to the corresponding $Fe^{3+}$-compounds. Said gas or gas flow can upon hydrochloric acid gas removal be disposed of in the atmosphere without further purification steps. Said aqueous solutions of one or more $Fe^{3+}$-compounds are of interest i.e. for use in wastewater treatment processes.

In a preferred embodiment, the present invention provides a process according to the first aspect, whereby an oxidizing agent is contacted with said aqueous solution comprising one or more $Fe^{2+}$-compounds. Said contact can be provided before said aqueous solution comprising one or more $Fe^{2+}$-compounds is added to said reactor or after adding said aqueous solution to said reactor. This is advantageous in order to assist and improve the conversion of one or more $Fe^{2+}$-compounds to $Fe^{3+}$-compounds.

In a preferred embodiment, the present invention provides a hydrogen chloride removal process as described above, whereby said fluid is a gas and whereby said oxidizing agent is an oxygen-comprising compound.

This is advantageous because said oxygen-comprising oxidizing agent generally leads to a low content of environmentally harsh side-products. More preferably, said oxidizing agent is selected from the group comprising, but not limited to: air, $O_2$, $H_2O_2$, NaOCl, $NaClO_3$, $ClO_2$ and $O_3$.

In a preferred embodiment, the present invention provides a hydrogen chloride removal process as described above, whereby said fluid comprises 0.1 to 30.0 vol. % of hydrochloric acid, preferably 0.5 to 25.0 vol. % of hydrochloric acid, even more preferably 0.5 to 15.0 vol. % of hydrochloric acid, most preferably 1, 2, 3, 4, 5, 6, 7, 8, 9 or 10 vol. % of hydrochloric acid or any amount there in between.

This is advantageous, because said process is able to reduce the amount of hydrochloric acid even in gases comprising a relatively low concentration of hydrochloric acid.

In a preferred embodiment, the present invention provides a process according to the first aspect, whereby said aqueous solution comprising one or more $Fe^{2+}$-compounds comprises non-iron metals in an amount of less than 5.0 wt. % relative to the total metal content, and preferably in an amount of less than 2.0 wt. %.

More preferably, said aqueous solution comprising one or more $Fe^{2+}$-compounds comprises non-iron metals in an amount of less than 1.0 wt. % relative to the total metal content, and more preferably in an amount of less than 0.5 wt. %. Most preferably, said aqueous solution comprises less than 0.1 wt. % of non-iron metals. This is advantageous since the aqueous $Fe^{3+}$ solution obtained by such a process is directly employable for water treatment purposes without any additional purification steps. The term 'non-iron metal' is used in the context of the invention to refer to any metal of the periodic table, and more preferably to refer to one or more metals selected from the group consisting of: arsenic, cadmium, chromium, mercury, nickel, lead, antimony, selenium, and manganese.

In a preferred embodiment, the present invention provides a hydrogen chloride removal process as described above, further comprising the step of evacuating from said reactor said exhaust gas comprising less than 10 vol. % of hydrochloric acid and/or said aqueous solution comprising $Fe^{3+}$-compounds. More preferably, said exhaust gas comprises less than 9 vol. %, preferably less than 8 vol. %, more preferably less than 7 vol. %, still more preferably less than 6 vol. %, yet more preferably less than 5 vol. %, even more preferably less than 4 vol. %, yet even more preferably less than 3 vol. %, still even more preferably less than 2 vol. %, yet still more preferably less than 1 vol. %, such as 0.9 vol. %, 0.8 vol. %, 0.7 vol. %, 0.6 vol. %, 0.5 vol. %, or any value there between, and still more preferably less than 0.5 vol. %, such as 0.4 vol. %, 0.3 vol. %, 0.2 vol. %, 0.1 vol. %, or any value there between, and yet more preferably less than 0.1 vol. % of hydrochloric acid.

In a preferred embodiment, the present invention provides a process according to the first aspect, whereby said one or more $Fe^{2+}$-compounds are provided in a stoichiometric excess relative to the amount of hydrochloric acid in said fluid or reactor feed gas. This is advantageous, because said stoichiometric excess allows for a quantitative or near-quantitative sequestration of hydrochloric acid from said fluid or said reactor feed gas.

In a preferred embodiment, the present invention provides a process according to the first aspect, whereby said reactor feed gas comprises nitrogen gas in an amount of at least 5 vol. % relative to the total amount of reactor feed gas, preferably in an amount of at least 25 vol. %. In an even more preferred embodiment, said reactor feed gas comprises at least 5 vol. % nitrogen gas and at least 5 vol. % oxygen gas; and preferably at least 20 vol. % nitrogen gas and at least 5 vol. % oxygen gas; and most preferable at least 40 vol. % nitrogen gas and at least 10 vol. % oxygen gas. In a more preferred embodiment, the present invention provides a process according to the first aspect, whereby said reactor feed gas comprises, and preferably consists of, air and hydrochloric acid.

This is advantageous, because reactor feed gas comprised of at least 5 vol. % of nitrogen gas can be easily provided as a waste hydrochloric acid gas composition in air, whereby said waste composition cannot be applied as a resource for useful industrial processes. Accordingly, expensive purification processes for waste hydrochloric acid gas are avoided and useful application is found for oxidation of $Fe^{2+}$-compounds to $Fe^{3+}$-compounds.

In a preferred embodiment, the present invention provides a hydrogen chloride removal process as described above, whereby the total concentration of one or more iron compounds in said aqueous solution is sufficiently low to prevent crystallization.

In a more preferred embodiment, said total concentration of one or more iron compounds in said aqueous solution is comprised between 0.1 and 50% wt. calculated on the iron content, more preferably between 0.5 and 40% wt., even more preferably between 1 and 30% wt., most preferably between 2 and 30% wt. In most preferred embodiment, said concentration is 3, 5, 8, 10, 13, 15, 18, 20, 23, 25, 28 or 30% wt. or any amount there in between.

In a preferred embodiment, the present invention provides a hydrogen chloride removal process as described above, whereby said $Fe^{2+}$-compounds comprise ferrous chloride and whereby said $Fe^{3+}$-compounds comprise ferric chloride.

In a preferred embodiment, the present invention provides a hydrogen chloride removal process as described above, whereby said aqueous solution comprising one or more $Fe^{2+}$-compounds is a waste pickle liquor or an aqueous solution obtained by dissolving iron containing materials in an acid such as hydrochloric acid, and preferably whereby said aqueous solution comprises one or more $Fe^{2+}$-compounds in an aqueous solution comprising 5 to 40% wt. of ferrous chloride and whereby preferably said reactor feed gas comprises 0.1 to 5.0 vol. %, and preferably 0.5 to 2.5 vol. % of hydrochloric acid.

Alternatively, other said iron containing materials may be dissolved in sulfuric acid or other acids known to dissolve solid iron or metallic iron compounds.

Suitable iron materials include, without limitation, iron, scrap iron, iron ore (e.g., hematite, magnetite, limonite, and the like), all industrial formed iron oxides, and the like. Optionally, instead of a solid iron containing material, pickling liquors can be used that contain high amounts of iron, and the like. Again, the pickling liquors may include ferrous salts, ferric salts, or mixtures thereof. The pickling liquor may be concentrated such as by distillation to increase the iron content, if desired.

In a preferred embodiment, the present invention provides a hydrogen chloride removal process as described above, whereby said aqueous solution comprising one or more $Fe^{2+}$-compounds is an aqueous solution comprising 5 to 40% wt. of ferrous chloride and whereby said fluid comprises 0.1 to 2.5 vol. % of hydrochloric acid.

In a preferred embodiment, the present invention provides a hydrogen chloride removal process as described above, at a temperature lower than 100° C., preferably at a temperature lower than 75° C., more preferably at a temperature between 0 and 50° C.

In a more preferred embodiment, said temperature is between 10 and 45° C., more preferably between 20 and 40° C. This is advantageous, because the oxychlorination reaction can be performed without the requirement for excessive heating of materials, which is an energy-intensive process.

Preferably, the present invention provides a hydrogen chloride removal process at a pressure between 0.1 and 25 atm. More preferably, said pressure is between 0.2 and 10 atm., even more preferably between 0.5 and 2 atm., most preferably between 0.75 and 1.25 atm. This is advantageous, because no additional provisions such as high-pressure pumps and/or high-pressure equipment are required in order to ensure the desired reduction of hydrochloric acid in said fluid comprising hydrochloric acid gas. Furthermore, existing equipment for the removal of hydrochloric acid using a water based process can be employed.

In a preferred embodiment, the present invention provides a hydrogen chloride removal process as described above, whereby at least 70% of hydrochloric acid is sequestered from said fluid comprising hydrochloric acid gas.

In a more preferred embodiment, at least 75% of hydrochloric acid is sequestered from said fluid comprising hydrochloric acid gas, more preferably at least 80%, more preferably than that at least 85%, even more preferably at least 90%, even more preferably than that at least 95%, most preferably at least 96%, 97%, 98% or 99%.

In a preferred embodiment, the present invention provides a hydrogen chloride removal process as described above, further comprising the step of absorbing hydrochloric acid from said fluid comprising hydrochloric acid gas in an aqueous solution comprising ferric chloride.

Said absorption occurs according to a reaction according to equation (5).

$$FeCl_3 + HCl \rightarrow FeCl_3 \cdot HCl \qquad (5)$$

This is advantageous, because said ferric chloride is capable to absorb hydrochloric acid through coordination bonding or stabilization, thereby further reducing the concentration of hydrochloric acid in the exhaust gas. In addition, said ferric chloride-hydrochloride product ($FeCl_3 \cdot HCl$) can be usefully employed for further industrial applications.

In a preferred embodiment, the present invention provides a hydrogen chloride removal process as described above, whereby an aqueous solution comprising $Fe^{2+}$- and/or $Fe^{3+}$-compounds is further contacted with a fluid comprising hydrochloric acid gas in a multistep process.

In a preferred embodiment, the present invention provides a hydrogen chloride removal process as described above, whereby said exhaust gas comprising a reduced hydrochloric acid content is further contacted with an aqueous solution comprising one or more $Fe^{2+}$- and/or $Fe^{3+}$-compounds in a multistep process.

This is advantageous, because a multistep process for treatment of a fluid comprising hydrochloric acid gas allows to further enhance the conversion of $Fe^{2+}$-compounds to $Fe^{3+}$-compounds. In addition, this is advantageous in order to further enhance the absorption of hydrochloric acid in an aqueous solution comprising ferric chloride, thereby further reducing the amount of hydrochloric acid in the exhaust gas.

In a second aspect, the present invention provides an aqueous ferric chloride solution and/or a ferric chloride-hydrochloride solution obtainable by a process according to the first aspect of the invention.

In a preferred embodiment, the present invention provides an aqueous ferric chloride solution as described above, whereby the concentration of ferric chloride and/or a ferric chloride-hydrochloride in said solution is between 10 and 70% wt. In another preferred embodiment, the concentration of ferric chloride and/or a ferric chloride-hydrochloride in said solution is higher than 70% wt.

In a more preferred embodiment, said concentration of ferric chloride in said solution is between 20 and 60% wt., more preferably between 25 and 50% wt., even more preferably between 30 and 45% wt., most preferably 32, 34, 36, 38, 40, 42 or 44% wt. or any concentration there in between.

In a third aspect, the present invention provides in a use of a ferric chloride solution according to the second aspect of the invention in a water or wastewater treatment process.

Aqueous solutions of ferric chloride ($FeCl_3$) are commonly used as flocculating agents for treatment of water, for hydrogen sulfide control, struvite control, sludge conditioning, color removal, phosphate removal, heavy metal removal, lime softening applications, and the like. For water treatment applications, the trivalent iron functions exceptionally well for both potable and wastewater clarification.

EXAMPLES

The following examples are intended to further clarify the present invention, and are nowhere intended to limit the scope of the present invention.

Example 1

A gas comprised of air and 1 vol. % hydrochloric acid (5) was brought in a 10 L oxychlorination reactor and contacted with 5 L of an aqueous pickle liquor comprising ferrous chloride obtained from an acid pickling process. The partial flow of hydrochloric acid was 5.8 L/h and the partial flow of atmospheric air was 520 L/h. In said reactor, an oxychlorination reaction occurs according to equation (2). Thereby, the concentration of ferrous chloride in said liquid was reduced and the concentration of ferric chloride was enhanced. Simultaneously, the exhaust gas was evacuated in a continuous manner from the reactor.

In order to determine the amount of hydrochloric acid in said exhaust gas, said exhaust gas was neutralized in a 1500 mL aqueous solution of 10% wt. NaOH and the amount of reacted NaOH was determined by potentiometric measurement.

The absorption and oxidation efficiencies are reported in Table 1. Also the amount of hydrochloric acid in exhaust gas is reported.

TABLE 1

Process parameters of a hydrogen chloride removal process according to example 1 with the respective fractions of absorbed and reacted hydrochloric acid.

| Fe | $FeCl_2$ |
|---|---|
| total contact time (hours) | 6 |
| temperature | room temperature |
| absorbed in solution (9) | 9% |
| reacted in solution (9)* | 85% |
| content HCl in exhaust gas (10)** | 6% |

*reacted from $Fe^{2+}$ to $Fe^{3+}$ according to Equation (2).
**determined by neutralization of HCl (g) in a NaOH solution and subsequent potentiometric measurement.

Example 2

Process as described in Example 1.

TABLE 2

Process parameters of a hydrogen chloride removal process according to example 2 with resulting fraction of absorbed and reacted hydrochloric acid.

| Fe | $FeCl_2/FeCl_3$ |
|---|---|
| total contact time (hours) | 6 |
| temperature | room temperature |
| absorbed in solution (9) | 0% |
| reacted in solution (9)* | 97% |
| content HCl in exhaust gas (10)** | 3% |

Example 3

A process for scavenging HCl from a gas flow was performed according to the process scheme of FIG. 1. A hydrochloric acid gas containing gas mixture (5) is entered in reactor 1 while an $Fe^{2+}$-rich aqueous mixture (7) is fed to reactor 2. In reactor 1, said hydrochloric acid gas containing gas mixture (5) is contacted with the $Fe^{2+}/Fe^{3+}$-mixture (8) from reactor 2. Simultaneously, a gas mixture partially stripped from hydrochloric acid (6) is transferred from reactor 1 to reactor 2. In said reactor 2, the gas mixture (6) is further stripped of hydrochloric acid upon contact with the $Fe^{2+}$-rich aqueous mixture (7) before being disposed in the atmosphere (10).

The composition of the different liquid mass flows is summarized in Table 3. The composition of the liquid mass flows was determined inline using standard potentiometric measurements.

TABLE 3

Composition of selected liquid compositions during the hydrochloric acid scavenging process according to Example 3.

| Mass flow* | density g/mL | $FeCl_3$ content % | $FeCl_3$ content % | HCl concentration g/L |
|---|---|---|---|---|
| 7 | 1.3748 | 0.81 | 14.50 | 7.40 |
| 8 | 1.3974 | 15.00 | 8.89 | 22.50 |
| 9 | 1.4480 | 31.10 | 3.27 | 51.30 |

*corresponding to FIG. 1.

What is claimed is:

1. A hydrogen chloride removal process, the process comprising:
   contacting in a reactor an aqueous solution comprising one or more $Fe^{2+}$-compounds with a reactor feed gas comprising an oxidizing agent, hydrochloric acid gas and optionally chlorine gas; and
   oxidizing said $Fe^{2+}$-compounds to $Fe^{3+}$-compounds,
   at a temperature lower than 100° C., thereby converting said reactor feed gas comprising an oxidizing agent, hydrochloric acid gas and optionally chlorine gas to an exhaust gas comprising a reduced hydrochloric acid content.

2. The hydrogen chloride removal process according to claim 1, whereby said hydrochloric acid gas is comprised in said reactor feed gas in an amount of at most 80 vol. %.

3. The hydrogen chloride removal process according to claim 2 wherein the hydrochloric acid gas is comprised in an amount of at most 60 vol. %.

4. The hydrogen chloride removal process according to claim 1, whereby an oxidizing agent is contacted with an aqueous solution comprising one or more $Fe^{2+}$-compounds.

5. The hydrogen chloride removal process according to claim 1, whereby said aqueous solution comprising one or more $Fe^{2+}$-compounds comprises non-iron metals in an amount of less than 5.0 wt. % relative to the total metal content.

6. The hydrogen chloride removal process according to claim 5, wherein the amount of the non-iron metals is less than 2.0 wt. % relative to the total metal content.

7. The hydrogen chloride removal process according to claim 1, whereby said one or more $Fe^{2+}$-compounds are provided in a stoichiometric excess relative to the amount of hydrochloric acid in said fluid.

8. The hydrogen chloride removal process according to claim 2, whereby said reactor feed gas comprises nitrogen gas in an amount of at least 5 vol. % relative to the total amount of reactor feed gas.

9. The hydrogen chloride removal process according to claim 8, wherein the amount of the nitrogen gas is at least 25 vol. % relative to the total amount of reactor feed gas.

10. The hydrogen chloride removal process according to claim 2, whereby said reactor feed gas comprises air and hydrochloric acid.

11. The hydrogen gas chloride removal process according to claim 10, wherein said reactor feed gas consists of air and hydrochloric acid.

12. The hydrogen chloride removal process according to claim 2, whereby said reactor feed gas comprises at least 5 vol. % nitrogen gas and at least 5 vol. % oxygen gas.

13. The hydrogen chloride removal process according to claim 1, whereby the total concentration of one or more iron compounds in said aqueous solution is sufficiently low to prevent crystallization.

14. The hydrogen chloride removal process according to claim 1, whereby said $Fe^{2+}$-compounds comprise ferrous chloride and whereby said $Fe^{3+}$-compounds comprise ferric chloride.

15. The hydrogen chloride removal process according to claim 1, whereby said aqueous solution comprising one or more $Fe^{2+}$-compounds is a waste pickle liquor or an aqueous solution obtained by dissolving iron containing materials in an acid.

16. The hydrogen chloride removal process according to claim 15, wherein the acid comprises hydrochloric acid.

17. The hydrogen chloride removal process according to claim 15, wherein said aqueous solution comprises one or more $Fe^{2+}$-compounds in an aqueous solution comprising 5 to 40% wt. of ferrous chloride.

18. The hydrogen chloride removal process according to claim 15, wherein said reactor feed gas comprises 0.1 to 2.5 vol. % of hydrochloric acid.

19. The hydrogen chloride removal process according to claim 1, at a temperature lower than 75° C.

20. The hydrogen chloride removal process according to claim 1, at a temperature between 0 and 50° C.

21. The hydrogen chloride removal process according to claim 1, further comprising the step of evacuating from said reactor an exhaust gas comprising less than 10 vol. % of hydrochloric acid.

\* \* \* \* \*